US008544858B2

(12) United States Patent
Eberlein (10) Patent No.: US 8,544,858 B2
(45) Date of Patent: Oct. 1, 2013

(54) STACK COMPRISING A NUMBER OF IDENTICAL SHOPPING CARTS PUSHED ONE INSIDE THE OTHER

(76) Inventor: Martin Eberlein, Kammeltal (DE)

( * ) Notice: Subject to any disclaimer, the term of this patent is extended or adjusted under 35 U.S.C. 154(b) by 0 days.

(21) Appl. No.: 13/634,816

(22) PCT Filed: Feb. 24, 2011

(86) PCT No.: PCT/DE2011/000193
§ 371 (c)(1),
(2), (4) Date: Sep. 13, 2012

(87) PCT Pub. No.: WO2011/127880
PCT Pub. Date: Oct. 20, 2011

(65) Prior Publication Data
US 2013/0026725 A1 Jan. 31, 2013

(30) Foreign Application Priority Data

Apr. 13, 2010 (DE) .......................... 10 2010 014 759
Oct. 4, 2010 (DE) .......................... 20 2010 013 816
Jan. 7, 2011 (DE) .......................... 20 2011 001 229

(51) Int. Cl.
*B62D 39/00* (2006.01)
(52) U.S. Cl.
USPC .................................................. 280/33.991
(58) Field of Classification Search
USPC ................ 280/33.992, 33.991, 33.997, 651, 280/47.34, 47.35, DIG. 4, 400
See application file for complete search history.

(56) References Cited

U.S. PATENT DOCUMENTS

| 5,199,728 | A | * | 4/1993 | Hutchison ................ 280/33.992 |
| 5,199,729 | A | | 4/1993 | Sievert et al. |
| 5,791,669 | A | * | 8/1998 | Broddon et al. ........... 280/47.34 |

(Continued)

FOREIGN PATENT DOCUMENTS

| DE | 7721314 U1 | 10/1977 |
| DE | 7822236 U1 | 10/1978 |

(Continued)

OTHER PUBLICATIONS

International Search Report for PCT/DE2011/000193, ISA/EP, Rijswijk, NL, mailed Aug. 4, 2011.

(Continued)

*Primary Examiner* — John Walters
*Assistant Examiner* — James Triggs
(74) *Attorney, Agent, or Firm* — Harness, Dickey & Pierce, P.L.C.

(57) ABSTRACT

A stack comprising a number of identical shopping carts pushed one inside the other, which stack can be transported with the aid of transportation means such as trucks, containers, and the like and is kept ready for removal and for use of the individual shopping carts after being transported to a collection point, which is constructed by self-service shops, wherein the shopping carts are pushed one inside the other by means of the chassis and the baskets thereof both during transport and at the collection point in such a way that a stack distance is formed between each shopping cart, wherein a stack distance is greater than a stack distance and the length of the stack having the stack distances is greater than the length of the same stack having the stack distances, and wherein the stack having the length is intended for transport and the stack having the length is intended to be provided at a collection point.

18 Claims, 7 Drawing Sheets

(56) References Cited

U.S. PATENT DOCUMENTS

| | | | |
|---|---|---|---|
| 5,860,485 A * | 1/1999 | Ebbenga | 180/19.2 |
| 6,022,031 A * | 2/2000 | Reiland et al. | 280/33.993 |
| 6,406,250 B2 * | 6/2002 | Jaeger et al. | 414/800 |
| 6,464,238 B2 * | 10/2002 | Reiland et al. | 280/33.993 |
| 6,523,840 B1 * | 2/2003 | Koppes et al. | 280/47.35 |
| 6,880,652 B2 * | 4/2005 | Holtan et al. | 180/19.2 |
| 6,926,291 B1 * | 8/2005 | Ondrasik | 280/33.991 |
| 7,168,711 B2 * | 1/2007 | Ondrasik | 280/33.991 |
| 7,396,025 B2 * | 7/2008 | Ondrasik | 280/33.991 |
| 7,549,651 B2 * | 6/2009 | Holtan et al. | 280/33.992 |
| 2008/0265534 A1 * | 10/2008 | Ondrasik | 280/33.991 |

FOREIGN PATENT DOCUMENTS

| | | |
|---|---|---|
| DE | 8227172 U1 | 12/1982 |
| DE | 8426844 U1 | 5/1985 |
| DE | 8508238 U1 | 10/1985 |
| DE | 3605055 A1 | 8/1987 |
| DE | 8714522 U1 | 5/1988 |
| DE | 8911371 U1 | 11/1989 |
| DE | 9212615 U1 | 11/1992 |
| DE | 10006999 A1 | 8/2001 |
| DE | 202006011849 U1 | 11/2006 |
| EP | 0 842 838 B1 | 5/1998 |
| GB | 2284985 A | 6/1995 |
| WO | WO 2008/122257 A1 | 10/2008 |

OTHER PUBLICATIONS

International Preliminary Report on Patentability regarding Application No. PCT/DE2011/000193 mailed Oct. 26, 2012.

* cited by examiner

STACK COMPRISING A NUMBER OF IDENTICAL SHOPPING CARTS PUSHED ONE INSIDE THE OTHER

CROSS-REFERENCE TO RELATED APPLICATIONS

This application is a 371 U.S. National Stage of International Application No. PCT/DE2011/000193, filed Feb. 24, 2011, which claims priority to German Patent Application Nos. 10 2010 014 759.1, filed Apr. 13, 2010; 20 2010 013 816.7 filed Oct. 4, 2010; and 20 2011 001 229.8, filed Jan. 7, 2011. The disclosures of the above applications are entirely incorporated herein by reference.

The invention relates to a stack comprising a number of identical shopping carts pushed one inside the other in accordance with the preamble of patent claim 1, and to a stack comprising a number of identical chassis pushed one inside the other and/or a number of identical baskets fitted one inside the other in accordance with the preamble of patent claim 2.

Shopping carts of the type presented here are dispatched by the manufacturers in stacks to the customers. Transport means for this purpose are as a rule trucks, ships, containers and the like. Customers for the shopping carts are usually self-service stores of known store chains. The shopping carts are delivered by the manufacturer in a state which is ready for use. The state which is ready for use requires a defined minimum spacing between the individual shopping carts which are kept available in the stack at a collection point, in order to ensure the functions of the shopping carts. Some of these functions include, for example, the freedom of the transport rollers from getting caught with the transport rollers of following shopping carts during the removal operation of the shopping carts from a stack, or the guarantee of it being possible to remove shopping carts from the stack and recoupling it to the latter again without difficulties, with the use of coin-operated locks. It is extremely important that the individual shopping carts also have to be spaced apart from one another, when they follow one another at stack spacings in a stack, to such an extent that complete stacks, even in the case of a meandering shape which is produced automatically during movement, can be moved without problems in car parks, with or without mechanical aid, without the individual shopping carts, and in particular their transport rollers, becoming jammed or caught in one another. Finally, the spacings of the shopping carts which are kept available for use have to be selected, for safety reasons, in such a way that, after the shopping carts have been used, fingers cannot be caught when the shopping carts are pushed into a stack.

The above-described situation also applies when chassis and/or baskets are delivered separately in stacks and are subsequently assembled to form utilizable shopping carts.

The shipping of shopping carts costs money, and the fewer shopping carts, chassis or baskets of a stack which is intended for transport are accommodated in a predefined area of a transport means, the higher ultimately the shipping costs which are produced per shopping cart.

Shopping carts are known which are equipped with means which reduce the impact forces which are produced when the shopping carts are pushed one inside the other, that is to say are stacked, in order firstly to reduce the noise which is produced during this operation and in order secondly to avoid damaging the shopping carts. In addition, said means can also be designed in such a way that they serve as a stop for that movable rear wall which closes the rear opening of the basket of the shopping carts. EP 0 842 838 B1 and WO 2008/122257 A1 describe shopping carts of this type, in which, during the stacking operation, parts or structural sections of a shopping cart which is to be pushed in in a rearward direction bear against the shock-damping means of a shopping cart which is located in front of it, or vice versa. Said means which are only a few millimeters thick are attached to the shopping carts during finishing of the shopping carts and before they are dispatched, with the result that the shopping carts are ready for use before they are dispatched.

Shopping carts are also known which have a basket which is supported by the chassis or can be placed onto the chassis, the volume of which basket can be reduced in order to attain a non-use position. The chassis of said shopping carts can also be modified in some cases into a space-saving non-use position. Said shopping carts are not suitable for being kept available at collection points, since they cannot be pushed one inside the other in a space-saving manner. Shopping carts of this type are therefore not made available to the customers by the self-service stores. Rather, shopping carts of this type are individual carts and the property of the customers who can stow shopping carts of this type in their car in a space-saving manner and can be taken along for shopping. A provision of carts of this type at collection points is not known. It is not provided that said shopping carts can be pushed one inside the other, since this is not required for individual carts.

Finally, shopping carts are known which have a storage means for drinks crates and the like, which storage means can be moved backward into a use position. In their non-use position, the storage means are located below the basket of said shopping carts, in a state in which said storage means are preferably folded together. This state is produced in principle when the shopping carts are located in a stack. DE 84 26 844 U1 describes shopping carts of this type.

Proceeding from this prior art, it is the object of the invention, in stacks of the type presented here, to search for solutions which reduce the shipping costs.

In relation to the stacks presented here, the solutions are described in the characterizing part of patent claims 1 and 2. Further solution features are found in the subclaims.

Whereas previously the length of the stack intended for transport and the length of the identical stack intended for the collection point were always identical, the decisive advantage of the invention then consists in the fact that, as a result of the now tighter stackability of the shopping carts, the length of the stacks in the case of said stacks being intended for transport is shorter than previously and therefore substantially more shopping carts are accommodated per unit area on a transport means than in the case of stacks which are kept available for the use of the shopping carts at collection points of the self-service stores and have to have a greater length on account of the requirements which were stated in the introduction. A considerable reduction in the shipping costs per delivered shopping cart can therefore be achieved as a result of the proposed solutions.

The same concept can also be transferred to stacks which are formed by chassis and/or baskets. The respective stack which is provided for transport also requires less space here than later at a collection point when the chassis and baskets, joined together, form the utilizable shopping carts.

A first advantageous option for reducing the length of a stack which is intended for transport, or for increasing the length of the identical stack which is intended for the collection point, comprises omitting spacer elements which can be attached to the shopping carts in the case of the shopping carts which are intended for transport, in order then, after the stack has been transported, to attach the spacer elements at suitable fastening points of the individual shopping carts, with the result that the latter are utilizable for being kept available at collection points and for use. Depending on the design of the shopping carts, there are fastening points which are arranged quite differently. Always suitable for this purpose are the baskets, the chassis or else separately provided connecting means which connect the baskets to the chassis. Suitable spacer elements are spacer elements which can be attached by way of fastening means or can be fastened in a latching manner or can be clipped on quite generally, which spacer elements are of buffer-like configuration and, after the fastening operation, remain immovable on the shopping cart at the point predetermined for them. Said points are selected on the baskets or chassis or connecting means in such a way that, when the shopping carts are pushed one inside the other, some part or parts of one shopping cart butt against the spacer elements of the respectively adjacent cart, or vice versa. Preferred fastening points for the spacer elements are, in the case of the basket, its side walls or its floor or the rear lower edge of the basket. In the case of the chassis, the longitudinal beams which carry the basket, for example, may be suitable, or else at least one transverse connection which connects the longitudinal beams in a known way. The abovementioned connecting means may likewise be suitable for carrying or forming the fastening points.

A second option for reducing the length of a stack which is intended for transport, or for increasing the length of the identical stack which is intended for the collection point, comprises likewise providing movable spacer elements at those fastening points on the shopping carts, as described above, it being possible, after the stack has been transported, for the spacer elements to be transferred from a first position, in which the stack is intended for transport and is shorter in length as a result, into a second position, with the result that the individual stack spacings between the shopping carts are greater and the therefore newly produced stack which is intended for a collection point is longer.

The stated examples are intended to illustrate that there are various options for achieving the useful effect which is the aim according to the invention. Said useful effect cannot be achieved by way of the shopping carts mentioned in the introduction as belonging to the prior art, because the means, parts and the like described in said prior art are not provided for the formation of stacks of different lengths, but rather are intended to achieve other objects.

The invention will be explained in greater detail using exemplary embodiments. In the drawing.

The shopping carts 2, 2a (see drawings) which are covered by the invention relate to all shopping carts which are kept available for use at collection points 14 for the customers in self-service stores. Since the construction of shopping carts 2, 2a of this type is well known enough, a detailed description is unnecessary here. A common feature of all of said shopping carts 2, 2a is that they have a chassis 3, 3a which carries at least one basket 4, 4a which is arranged such that it is secured against release, that is to say in a stationary manner on the chassis 3, 3a, and remains in the once mounted position. It is also essential that the shopping carts 2, 2a can be pushed one inside the other in a space-saving and known way, with the result that at least two identical shopping carts 2 or 2a form a stack 1 or 1a, their chassis 3 or 3a and their baskets 4 or 4a being pushed partially one inside the other. For this purpose, the rear-side opening of the basket 4, 4a of the shopping carts 2, 2a can be closed in a likewise known way by a pivotable rear wall 5, see also FIG. 12.

Figure 1:
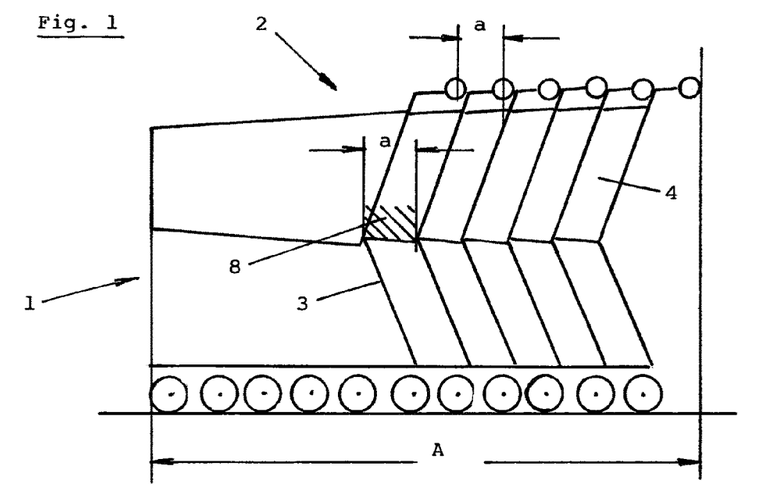
FIG. 1 shows a stack which is formed from identical shopping carts and is intended for transport.

FIG. 1 shows a stack 1 which is provided for transport, is to be delivered by the manufacturer of the shopping carts 2 to a self-service store and is formed by at least two identical shopping carts 2 which are pushed one inside the other. The shopping carts 2 are pushed with their chassis 3 and with their baskets 4 one inside the other in such a way that they butt in a known way against some parts or sections on the following shopping carts 2, with the result that, likewise in a known way, a stack spacing which is produced from one to the next shopping cart 2 in each case is formed with the length a which can no longer be reduced. The overall length of the stack 1 which is formed from a plurality of shopping carts 2 in this way and is intended for transport is labeled by the dimension A. In addition and in a hatched manner, the unused stack space region 8 is shown which is formed between two shopping carts 2, results as is known when the shopping carts 2 are pushed one inside the other, and is not used by the remaining rear section of a shopping cart 2 which is respectively to be pushed in. This stack space region 8 is also called "dead stack space" in technical terminology. Its horizontally extending length is the stack spacing a.

Figure 2:
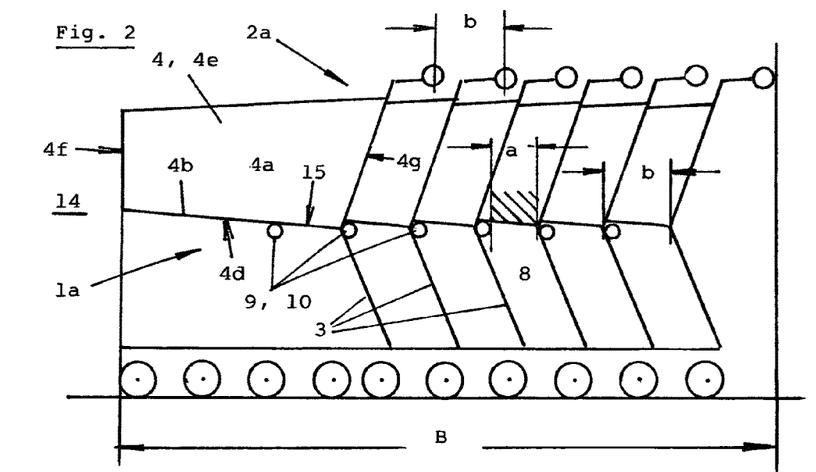
FIG. 2 shows the same stack which is equipped with subsequently attached spacer elements, at a collection point.

FIG. 2 shows the stack 1a which is described in FIG. 1, is formed from the same number of shopping carts 2a and is now located at a collection point 14 of a self-service store, in order that customers can remove individual shopping carts 2a for use in the usual way. This use requires, as has already been noted in the introduction, a predefined minimum stack spacing between two adjacent shopping carts 2a having the length b which is greater than the stack spacing a, see FIG. 1. In the example, the greater stack spacing b can be achieved by spacer elements 9, such as buffers 10 and the like, which, after the shopping carts 2 have been transported, are subsequently attached to each shopping cart 2a. As a result of the introduced volume of the spacer elements 9, the stack spacing between the individual shopping carts 2a is increased from a to b. It is recommended to provide at least two spacer elements 9 on each shopping cart 2a, only one spacer element 9, which would then have to be wider, per shopping cart 2a likewise being conceivable. The spacer elements 9 remain in a stationary manner on the shopping carts 2a, in an unchanged position. This arrangement can be achieved, for example, by using suitable fastening points on the shopping carts 2, 2a, by screwing or riveting or by clipping on with subsequent latching, etc. Fastened in this way, the spacer elements 9 can be arranged, for example, on the underside 4d of the basket floor 4b, or on the rear lower edge 6 of the baskets 4a or on the two side walls 4e of the baskets 4, or on two supporting devices 15 which connect the baskets 4 to the chassis 3, or on the chassis 3, see also FIGS. 3 to 6a. It can be seen from the diagrammatically drawn illustration that, in the example, the spacer elements 9 are located in a region between the front side 4f and the rear side 4g of the baskets 4, as viewed in the side view shown of the shopping carts 2a, in the case of every shopping cart 2a, independently of whether the spacer elements 9 are then located on the basket 4 or on the supporting devices 15 or on the chassis 3a. In the example, the position of the spacer elements 9 on each shopping cart 2a is selected in such a way that, when the shopping carts 2a are pushed one inside the other, in order to form a stack 1a, the shopping carts 2a butt on or with their spacer elements 9 against at least one suitable component of the respectively following shopping cart 2a, the position of which component cannot be varied, and a stack spacing b is formed in each case by the inserted spacer elements 9 between the shopping carts 2a, which stack spacing b is greater than the stack spacing a which is formed in each case between the shopping carts 2 of the stack 1 which is intended for transport. In the example, the at least one spacing element 9 of a shopping cart 2a to be pushed into the stack 1a butts against the rear lower edge 6 of the basket 4a of the shopping cart 2a located in front of it. However, the spacer elements 9 can also butt against the chassis 3a of the shopping cart 2a located in front of it. For comparison, the unused stack space region 8 which is shown in FIG. 1 is likewise illustrated in FIG. 2. Using the last shopping cart 2a pushed into the stack 1a, the drawing shows that the at least one spacer element 9 is arranged at a spacing in front of the stack space region 8, as viewed in the pushing direction of the shopping carts 2a, with the result that the greater stack spacing b is set. Therefore, in the example, the closer the front side 4f of the basket 4 is approached with the arrangement of the spacer elements 9, the greater the length of the stack spacings b. It follows from this that, after the spacer elements 9 have been attached to the shopping carts 2a, the length B of the stack 1a which is intended for the collection point 14 is greater than the length A of the stack 1 which is shown in FIG. 1, comprises the same number of shopping carts 2 and is intended for transport.

Figure 2A:
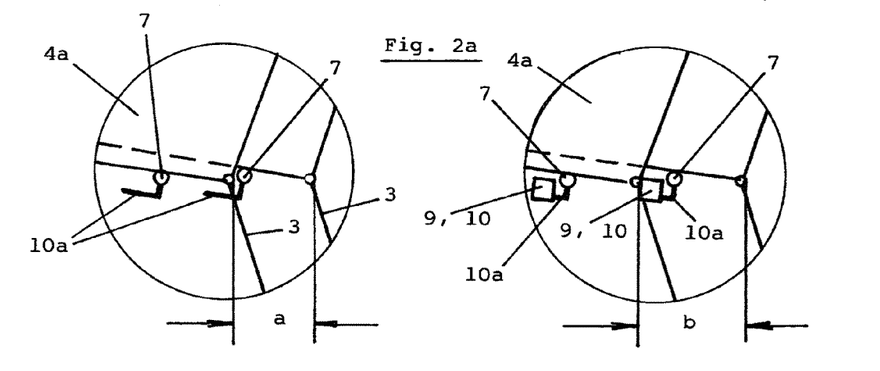
FIG. 2a shows two details from FIGS. 1 and 2.

In a supplementary manner to FIG. 2, FIG. 2a shows that region, in which the two spacer elements 9 are arranged on the shopping carts 2a. A transverse connection 7, for example, is provided below the basket 4, 4a of each shopping cart, which transverse connection 7 connects the two longitudinal sides of the chassis 3, 3a in a known way. In the example, each transverse connection 7 has two fastening points 10a which, configured as hooks, are arranged on the transverse connection 7. After the shopping carts 2 have been transported, the spacer elements 9 which are configured in the form of buffers 10 are plugged onto the forwardly pointing free ends of the hook-shaped fastening points 10a. Measured from the floor, the fastening points 10a are arranged to be lower than the rear lower edge of the baskets 4, 4a. The stack spacings a and b can be seen again from the drawing.

Figure 3:
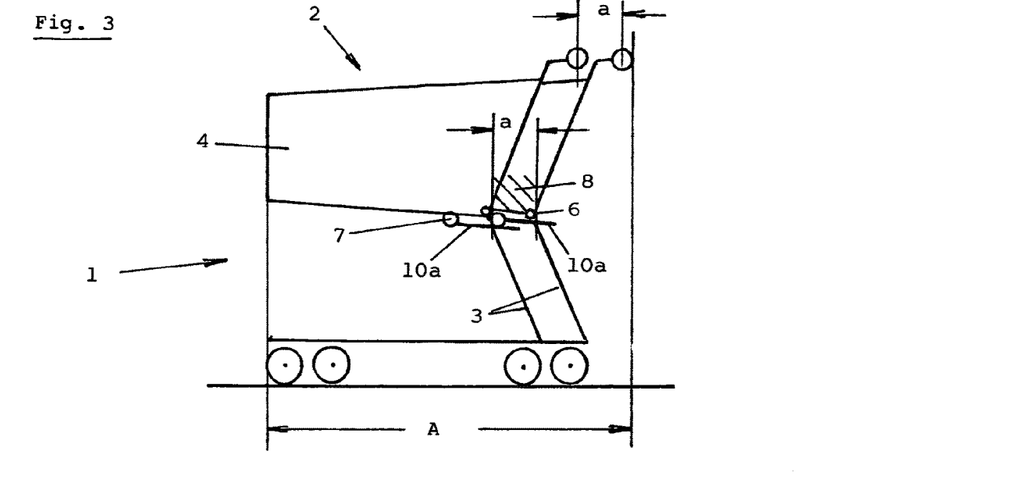
FIG. 3 shows two shopping carts in the style of FIG. 1.
Figure 4:
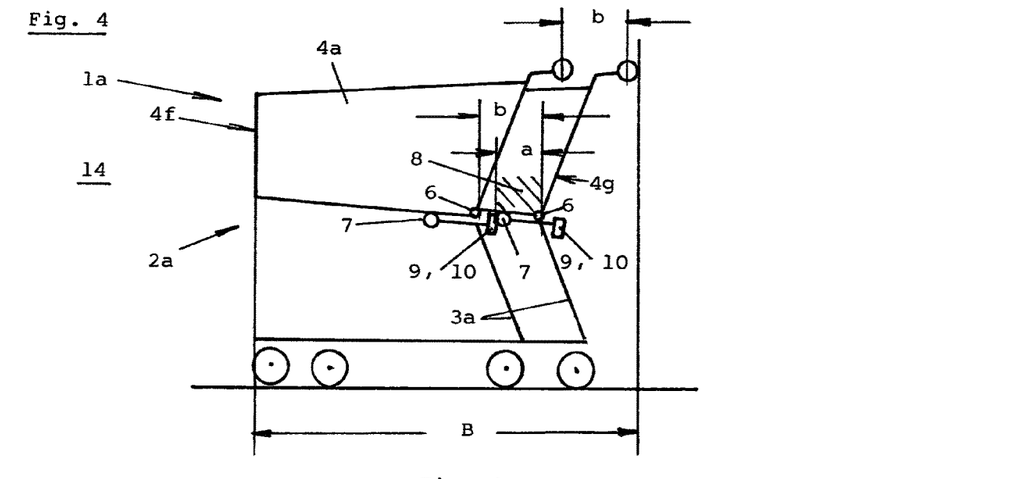
FIG. 4 shows two shopping carts in the style of FIG. 2.
Figure 4A:
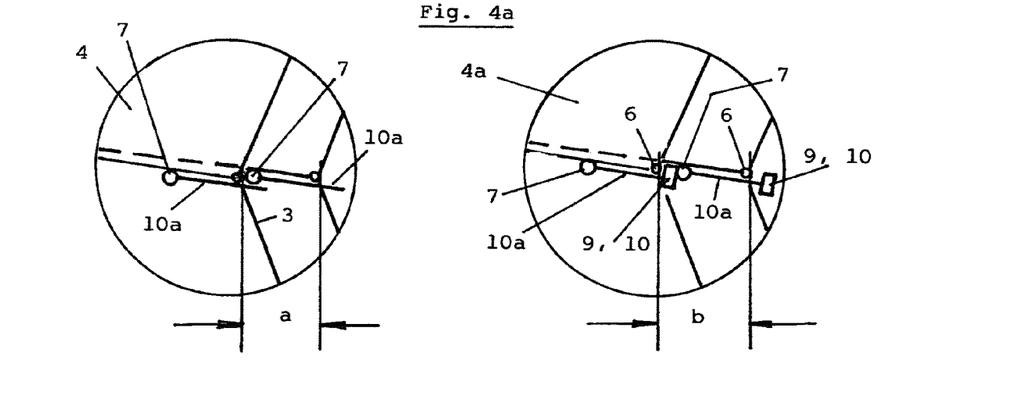
FIG. 4a shows two details from FIGS. 3 and 4.
Figure 5:
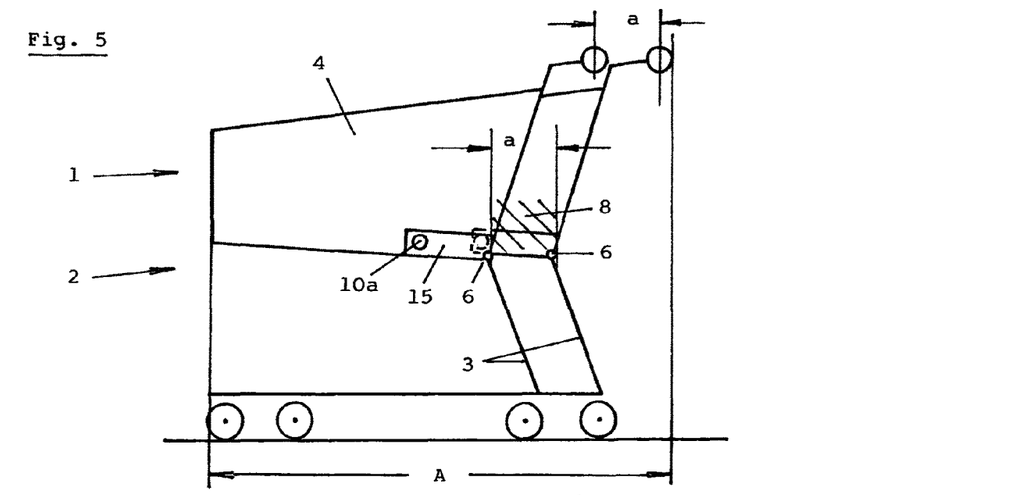
FIG. 5 shows two further shopping carts in the style of FIG. 1.
Figure 6:
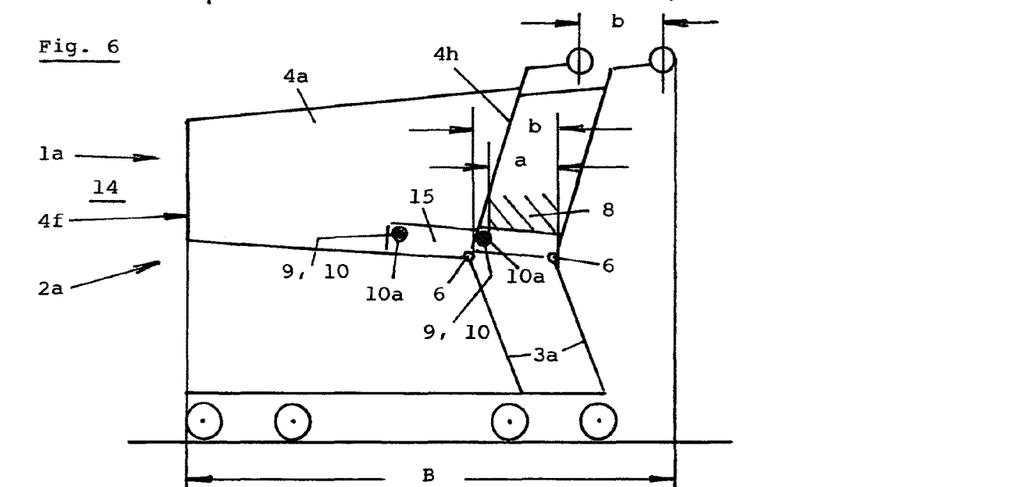
FIG. 6 shows two further shopping carts in the style of FIG. 2.
Figure 6A:
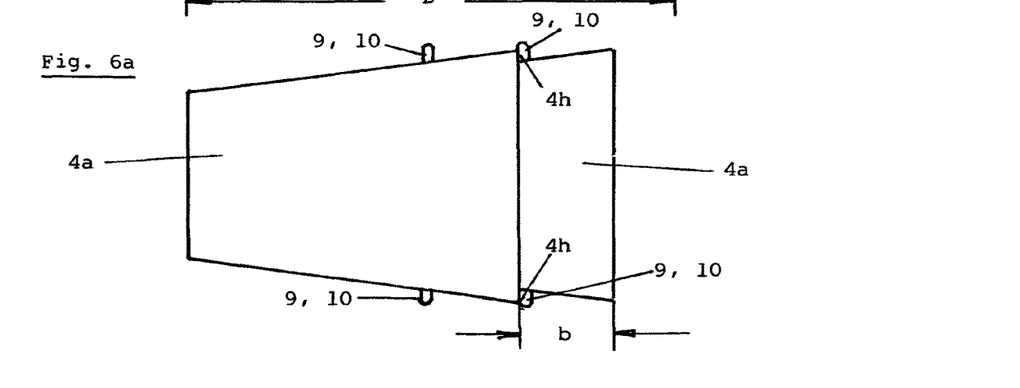
FIG. 6a shows a detail from FIG. 6.

Using two shopping carts 2, 2a which are pushed one inside the other, FIGS. 3, 4 and 4a show a further example of how, in a likewise practical way, the stack spacings a of the shopping carts 2 can be changed into stack spacings b. In contrast to the solutions which are proposed in FIG. 2, the spacer elements 9 are not situated between the front side 4f and the rear side 4g of the baskets 4a, but rather behind the rear lower edge 6 of each basket 4a, see FIG. 4. Here too, the fastening points 10a are arranged to be lower than the rear lower edge 6 of the baskets 4, 4a. A transverse connection 7, for example, is located below the basket 4, 4a of the shopping carts 2, 2a, which transverse connection 7 is likewise positioned between the front side 4f and the rear side 4g of each basket 4, 4a and belongs to the chassis 3. FIG. 3 shows two shopping carts 2 which do not have any spacer elements 9. When the two shopping carts 2 are pushed one inside the other, the transverse connection 7 of the rear shopping cart 2 which is pushed in comes into contact, for example, with the rear lower edge 6 of the basket 4, but not with the fastening points 10a of the shopping cart 2 located in front of it. This results in the stack spacing a between the individual shopping carts 2, which in turn produces a stack 1, which is intended for transport and has the length A, from a number of identical shopping carts 2. Shown in addition and again in a hatched manner is the unused stack space region 8 which is formed by the stack spacing a between the two shopping carts 2. In the case of every shopping cart 4, 4a, the fastening points 10a are located behind the stack space region 8.

If, after the stack 1 has been transported, at least one, usually two spacer elements 9 are attached at the rear to the chassis 3a of the shopping carts 2a, at the fastening points 10a which project rearward beyond the rear lower edge 6 of the basket 4, the result of the introduced volume of the spacer elements 9 when the shopping carts 2a which are equipped with the spacer elements 9 are pushed one inside the other is the stack spacing b which is greater than the stack spacing 1a. For comparison, the unused stack space region 8 which is shown in FIG. 3 is likewise also illustrated in FIG. 4. Using the last shopping cart 2a pushed into the stack 1a, the drawing shows that the at least one spacer element 9 is arranged at a spacing behind the stack space region 8, as viewed counter to the pushing direction of the shopping carts 2a, and therefore produces the greater stack spacing b as a result of its volume. The further away to the rear from the stack space region 8 the at least one spacer element 9 is therefore positioned on the shopping carts 2a, the greater the length of the stack spacings b. It follows from this that the length B of the stack 1a which is newly provided in this way and is intended now for a collection point 14 is greater than the length A of the stack 1 which comprises the same number of shopping carts 2 and is intended for transport. The same effect can also be achieved if, after a stack 1 has been transported, the spacer elements 9 are attached in a suitable way to the rear lower edge 6 of the baskets 4a, from where the spacer elements 9 then either project rearward or protrude downward by a predefined amount. When the shopping carts 2a are pushed one inside the other, the transverse connection 7 or the chassis 3a of the shopping cart 2a to be pushed in butts against the at least one rearwardly or downwardly projecting spacer element 9, in order to form the stack spacing b.

In the style of FIGS. 1 and 2, FIGS. 5, 6 and 6a (plan view) show a further option for subsequently attaching spacer elements 9 to the shopping carts 2. As a rule, the baskets 4 of the shopping carts 2, 2a are fastened to the chassis 3, 3a with the aid of supporting devices in pairs. The supporting devices 15 are flat webs which are arranged in an upright manner in a known way. In their front region, the supporting devices 15 are provided with a horizontal aperture which extends transversely with respect to the pushing direction of the shopping carts 2, 2a. Each aperture forms a fastening point 10a for a spacer element 9 which is configured as a buffer 10. After the shopping carts 2 have been transported, each spacer element is plugged into an aperture and is secured against release. Instead of the supporting devices 15, flat steel pieces which are attached in an upright manner and likewise and analogously have a fastening point 10a for a spacer element 9 can be provided on each longitudinal side of the basket. In the stack 1a, the spacer elements 9 which project laterally to the outside butt against the rear boundary 4h of the side walls 4c of the baskets 4a of the shopping carts 2a respectively located in front of them. The different stack spacings a and b and the different lengths A and B of the stacks 1 and 1a are again illustrated in the drawings. In order to avoid repetitions, all further features and details can be determined in conjunction with the preceding exemplary embodiments using the entered item numbers.

Figure 7:
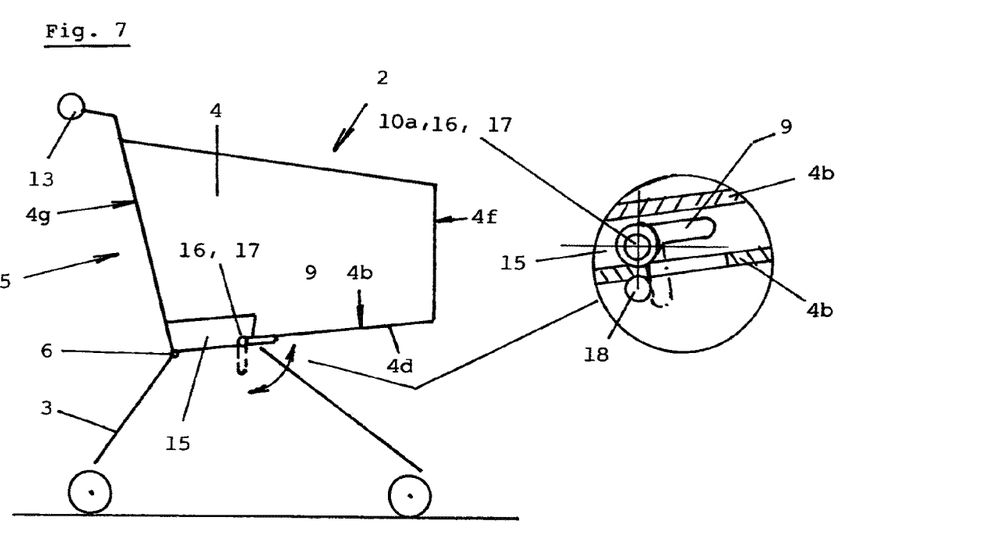
FIG. 7 shows a shopping cart having movably arranged spacer elements.

FIG. 7 shows a shopping cart 2, to which at least one, usually two movable spacer elements 9 are attached and which, like the previously described spacer elements 9, are likewise intended to establish the stack spacing of a plurality of shopping carts 2 to be at least a greater stack spacing b which is provided for the use of the shopping carts 2. In this exemplary embodiment, the shopping cart 2 is equipped on both sides with in each case one supporting device 15 which connects the basket 4 to the chassis 3, a movable spacer element 9 usually being attached to each supporting device 15. Spacer elements 9 which are arranged movably in this way can also be provided in a suitable way and at suitable fastening points 10a on the chassis 3 or on the basket 4, in particular on its underside 4d. It can in turn be seen from the drawing that the at least one spacer element 9 is arranged in a region between the front side 4f and the rear side 4g of the basket 4. In the example, each spacer element 9 is arranged below, or lower than, the basket floor 4b which is configured in a known way in the manner of a lattice or with apertures. In details and on an enlarged scale, the detail which is illustrated in the circle shows the arrangement which has just been described. Each spacer element 9 is a simple stop part which is mounted such that it can be moved about a horizontal axis 16 on a pin section 17 which forms a fastening point 10a. Each spacer element 9 can be moved either by hand or automatically with the aid of gravity out of a non-use position, in which it is arranged approximately parallel to the basket floor 4b and in which is remains without function when the shopping carts 2 are pushed one inside the other, into a downwardly directed use position, see dash-dotted illustration, in which it can then assume its stop function. The at least one spacer element 9 assumes the non-use position when it is the aim to transport a stack 1 which is formed from a plurality of identical shopping carts 2. In the use position, in contrast, the at least one spacer element 9 is intended to come into contact with at least one part which is arranged in the rear region of a shopping cart 2 located in front of it, for example with the rear lower edge 6 of the basket 4a, the spacer element 9 being supported to the rear, for example, on a supporting part 18 which is arranged on a supporting device 15 or on the chassis 3, in order to absorb the jolt which is produced when the shopping carts 2a are pushed one inside the other, see also FIG. 9. The double arrow shows the extent of the movability of the at least one spacer element 9. Each spacer element 9 is therefore arranged on the shopping carts 2, 2a such that it can be transferred from a first position (non-use position) into a second position (use position).

Figure 8:
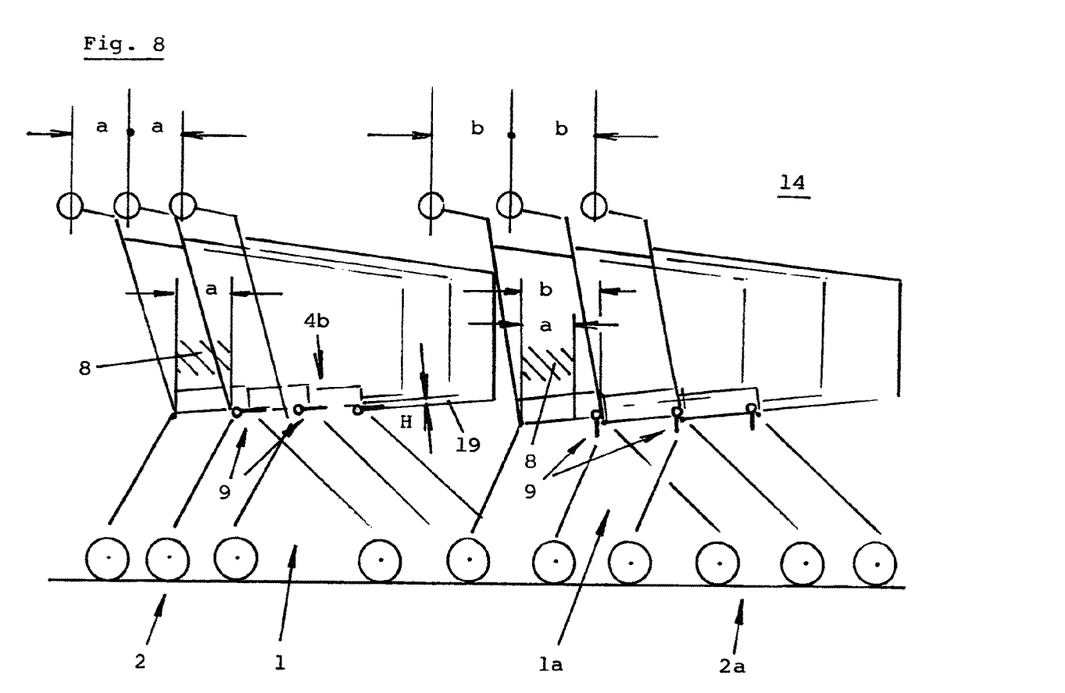
FIG. 8 shows a stack, in which both the arrangement of the spacer elements of the shopping carts which are intended for transport and also their arrangement in the case of the shopping carts which are intended for use can be seen.

In a drawing on the left, FIG. 8 shows a stack 1 which is intended for transport and, moving over to the right, the same stack 1a which is then provided for use at a collection point 14. For the sake of simplicity, each of the two stacks 1, 1a is shown by in each case three shopping carts 2, 2a. In the case of the stack 1 which is intended for transport, the spacer element or elements 9 assumes/assume that non-use position, in which they are arranged approximately parallel to the basket floor 4b. In order for it to be possible to stack shopping carts 2, 2a in a space-saving manner, a space 19 is formed in each case in a known way between the basket floors 4b of the shopping carts 2, which basket floors 4b are arranged so as to rise obliquely individually and so as to be offset. The invention uses this circumstance. It can be seen in the drawing that in each case at least one spacer element 9 which is located in the non-use position is accommodated in each case one space 19 which is located between the basket floor 4b of a shopping cart 2 and the basket floor 4b of the respectively next shopping cart 2 located in front of it, see also FIG. 9. The height of each space 19 is labeled by the dimension H. In the case of the stack 1a which is shown on the right, the at least one spacer element 9 is located in the use position. In this position, that is to say in the second position, the stack spacing b is set which is greater between the individual shopping carts 2a which are intended for use than the respective stack spacing a of those shopping carts 2 which form the stack 1 intended for transport and in the case of which stack spacing a the spacer elements 9 assume the first position. For comparison, the unused stack space regions 8 are illustrated again. The length B of the stack 1a which is formed in this way, is intended for a collection point 14 and has the stack spacings b is therefore again greater than the length A of the stack 1 which is formed from the same number, has the stack spacings a and is intended for transport.

Figure 9:
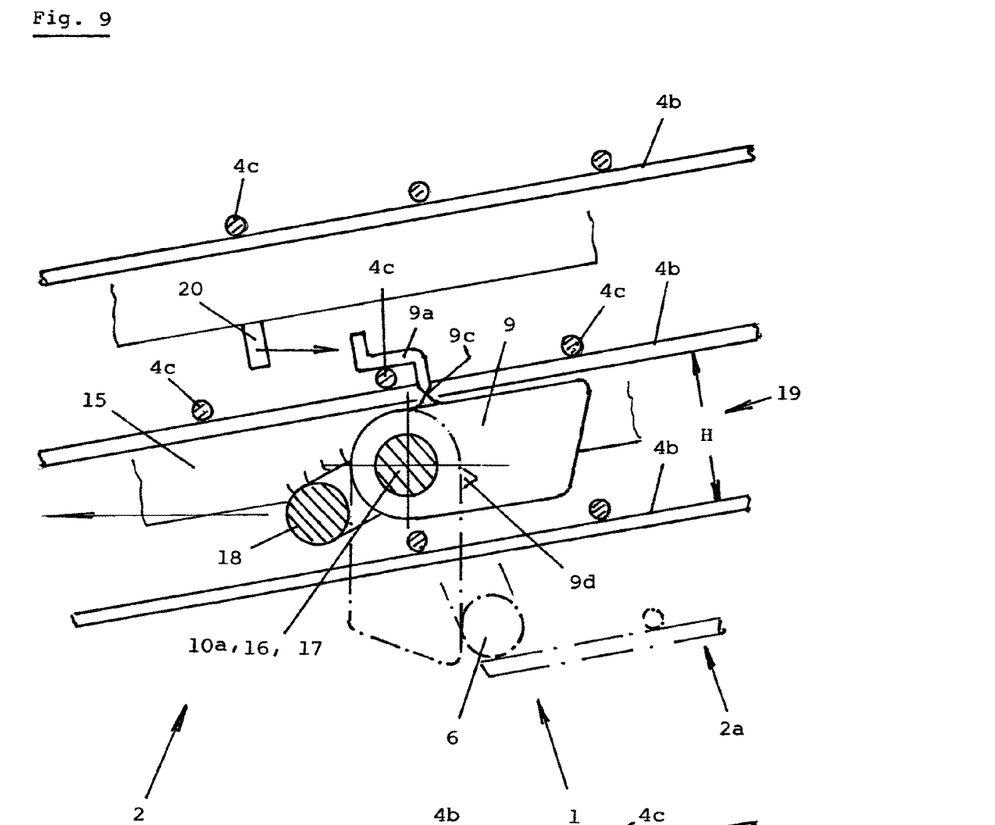
FIG. 9 to FIG. 11 show further design and arrangement options for movable spacer elements.

In details and in a diagrammatic manner, FIG. 9 shows the basket floors 4b of three shopping carts 2 which are pushed one inside the other in a space-saving manner. The drawing shows the at least one spacer holder 9 of the second, that is to say middle shopping cart 2 of the stack 1. The spacer element 9 which is shown (there is usually one on each side of the shopping cart 2) is mounted on the pin section 17 such that it can be pivoted about the horizontal axis 16 to a limited extent. The spacer element 9 is located either completely or partially in the space 19 which is formed by the basket floors 4b of the second and third shopping carts 2. In the example, the pin section 17 or fastening point 10a is arranged on a supporting device 15 and extends horizontally. Corresponding pin sections 17 can also be arranged at suitable fastening points 10a on the underside 4d of the basket floors 4b or on the chassis 3a. Here, the spacer element 9 is located in the non-use position and is arranged approximately parallel to the basket floor 4b which lies above it. The basket floor 4b which is illustrated at the very bottom belongs to the first, that is to say frontmost of the three said shopping carts 2. The basket floor 4b which is illustrated at the very top belongs to the last shopping cart 2 pushed in. On its upper side, the spacer element 9 can be equipped with a projection 9a which is guided upward through the lattice-shaped basket floor 4b and engages from above around one of the transverse wires 4c of the basket floor 4b. As a result, the spacer element 9 is locked in its non-use position and cannot pivot downward out of said first position. During the assembly of the shopping carts 2, the spacer elements 9 are moved into said secured position after the basket 4 has been placed onto the chassis 3, with the result that the spacer elements 9 do not perform any function at all. Each spacer element 9 is connected to a projection 9a via a predetermined break point 9c. If a shopping cart 2 is then pushed into a shopping cart 2 located in front of it, in order to form a stack 1 which is intended for transport, either a stop 20 which is provided on the basket 4 or on a supporting device 15 or else, depending on the design, a transverse wire 4c, assuming the function of a stop 20, of the basket floor 4b of the shopping cart 2 which is pushed in comes into contact with the projection 9a of the spacer elements 9 and separates said projection 9a from the spacer elements 9. As a result, each spacer element 9 loses its locking action and falls downward only, however, until it rests on the upper side of the basket floor 4b of the shopping cart 2 located in front of it. When the shopping carts 2 are separated from the stack 1, each shopping cart 2 is pulled rearward out of the stack 1. Here, each spacer element 9 of the shopping cart 2 to be pulled out "jolts" from one to the next transverse wire 4c of the basket floor 4b of the shopping cart 2 located in front of it, until it has negotiated the lower rear edge 6 of the basket 4 of the shopping cart 2 located in front of it. Having lost their locking action, the spacer elements 9 then fall downward automatically and, then assuming the second position and therefore the use position, are supported to the rear on a supporting part 18 which is expediently arranged either on the underside of the basket floor 4b or on a supporting device 15. The spacer element or elements 9 hangs/hang downward, and the drawing shows the rest of the section 9d, which still remains on the spacer element 9, of the predetermined break point 9c which is formed between the spacer element 9 and the projection 9a. In this operation, the projection 9a falls as an excess part to the floor and no longer has a function. In addition, the rear lower edge 6 of the basket 4 of a shopping cart 2a located in front of it is illustrated using dash-dotted lines. When the shopping cart 2a is pushed in, each spacer element 9 comes into contact with the rear lower edge 6 of the basket 4 of the shopping cart 2a located in front of it. A plurality of shopping carts 2a having spacer elements 9 which are located in the use position therefore form the stack 1a which is intended for use and for being kept available at a collection point 14, in the case of which stack 1a the stack spacing b of the individual shopping carts 2a is greater than the respective stack spacing a of the individual shopping carts 2 which form a stack 1 which is intended for transport. The operation which has just been described also functions with spacer elements 9 which certainly have a projection 9a, but do not latch with a transverse wire 4c. Depending on the position of the centroid of the spacer elements 9, they can also remain automatically in the non-use position and, only after contact has taken place, can assume an intermediate position until the shopping cart 2a is pulled out of the stack 1a again and the spacer elements 9 assume their use position automatically on account of their predefined centroid position.

Figure 10:
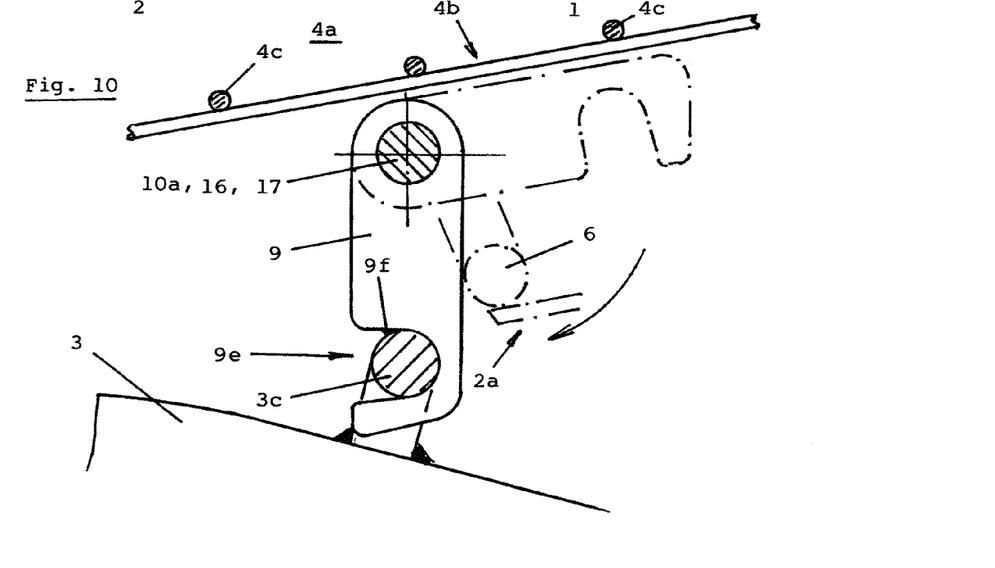

In the style of the solution according to FIG. 9, FIG. 10 shows a spacer element 9 in the use position, which spacer element 9 is likewise mounted on a pin section 17 which serves as fastening point 10a, such that said spacer element 9 can be moved about a horizontal axis 16, in which use position the at least one spacer element 9 is supported on a transverse web 3c which is arranged on the chassis 3 and, for example, connects the two longitudinal sides of the chassis 3. In each case one stop 3c which assumes the function of a transverse web 3c can also be provided per longitudinal side of the chassis 3. The spacer element 9 has a gap 9e which engages partially around the transverse web 3c in such a way that the basket 4a is additionally supported on the chassis 3 with the aid of the at least one spacer element 9. The drawing also shows that moment, at which the shopping cart 2a, when it is being pushed inside a shopping cart 2a which is located in front of it, butts against the rear lower edge 6 of the basket 4a of the latter, see also FIG. 9. During every butting operation, the at least one spacer element 9 is therefore pressed again and again with its gap 9e against the transverse web 3c. If the gap 9e is equipped with a small undercut 9f, the at least one spacer element 9 remains fixed in the position which is shown in the drawing. It does not become detached from the transverse web 3c during the use of the shopping cart 2a. Illustrated using dash-dotted lines, the at least one spacer element 9 is shown in its non-use position, in which, located below the basket floor 4b, it is arranged parallel to the latter and assumes its first position. Instead of at least one movable spacer element 9, at least one spacer element 9 which can be fastened after the stack 1 has been transported can also be provided, see FIG. 2, with the aid of which spacer element 9 the basket 4a is likewise supported additionally on the chassis 3. All the details which are not described further here can be gathered analogously from the descriptions according to FIG. 2 and FIG. 9.

Figure 11:
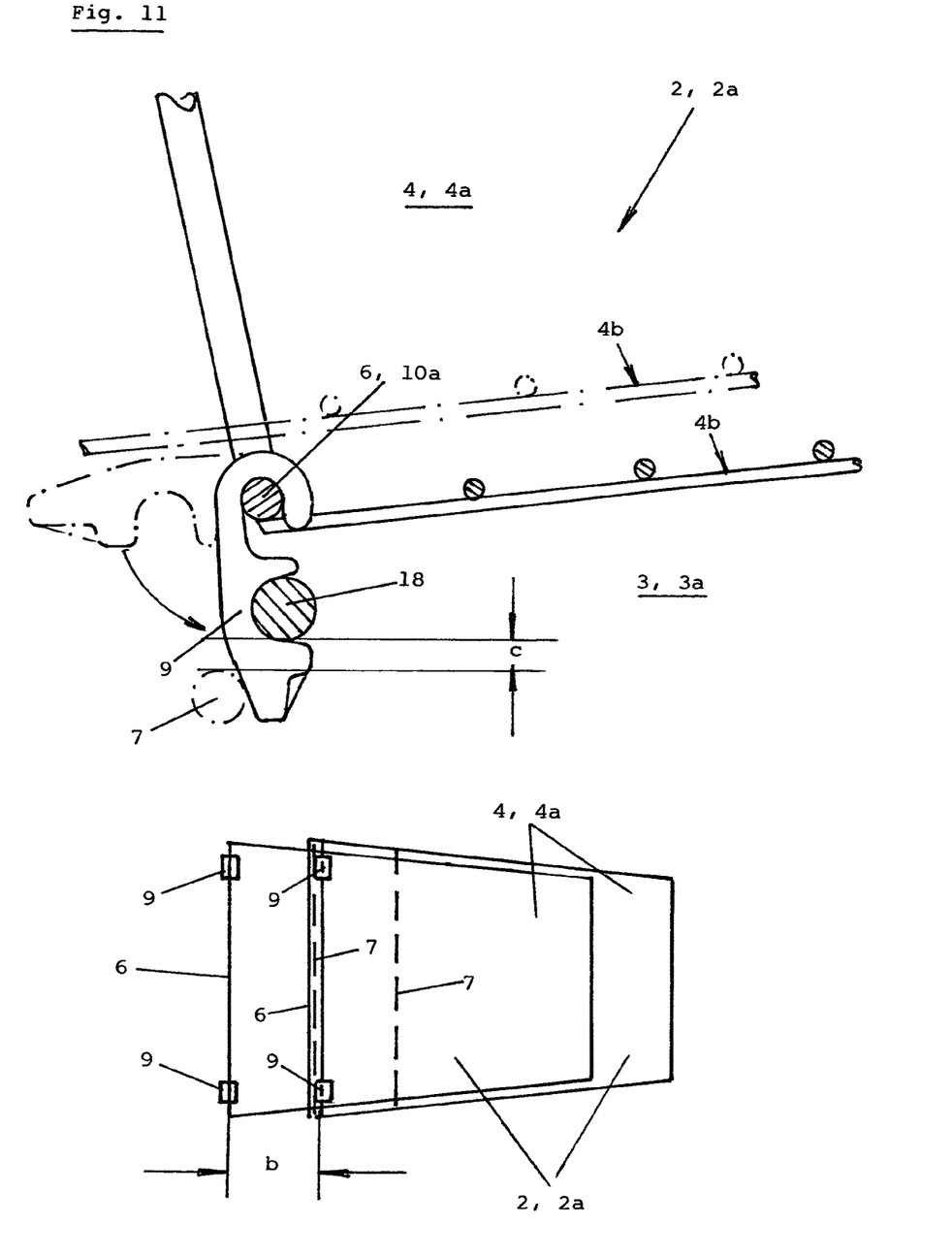

In details and in two views, FIG. 11 shows that region on a shopping cart 2, 2a, in which the rear lower edge 6 of the basket 4, 4a is located. In the example, the rear lower edge 6 serves as fastening point 10a for at least one, as a rule for two spacer elements 9. The spacer element or elements 9 is/are mounted on the rear lower edge 6 such that it/they can be pivoted about a horizontal axis. In the non-use position, illustrated using dash-dotted lines, the spacer elements 9 point to the rear, extend parallel to the basket floor 4b and assume their first position. In the drawing, the spacer elements 9 are pivoted downward into their use position, in which they assume the second position. The spacer elements 9 butt with a gap-shaped cutout against a or in each case one separate supporting part 18 which belongs to the chassis 3, 3a. The cross section of a transverse connection 7 or two separate transverse connection sections 7 is illustrated showing dash-dotted lines. The transverse connection 7 belongs to a shopping cart 2, 2a which is pushed rearward into the shopping cart 2, 2a, is arranged on its chassis 3, 3a and butts against the at least one spacer element 9, in order to form a stack spacing b, see also plan view. The transverse connection 7 or the transverse connection sections 7 are arranged so as to be lower by the amount c than the at least one supporting part 18. As a result, it is possible, in the case of spacer elements 9 which are located in the non-use position, that is to say are pivoted upward, to push the shopping carts 2 one inside the other more tightly, in order to form the stack spacings a which are smaller than the stack spacings b. During this operation, the transverse connection 7 or the transverse connection sections 7 migrate/migrates under the at least one supporting part 18. The stack 1a having the stack spacings b is again intended for a collection point 14 and its length B is greater than the length A of the stack 1 which is intended for transport and has the stack spacings a, cf. also the preceding descriptions.

Figure 12:
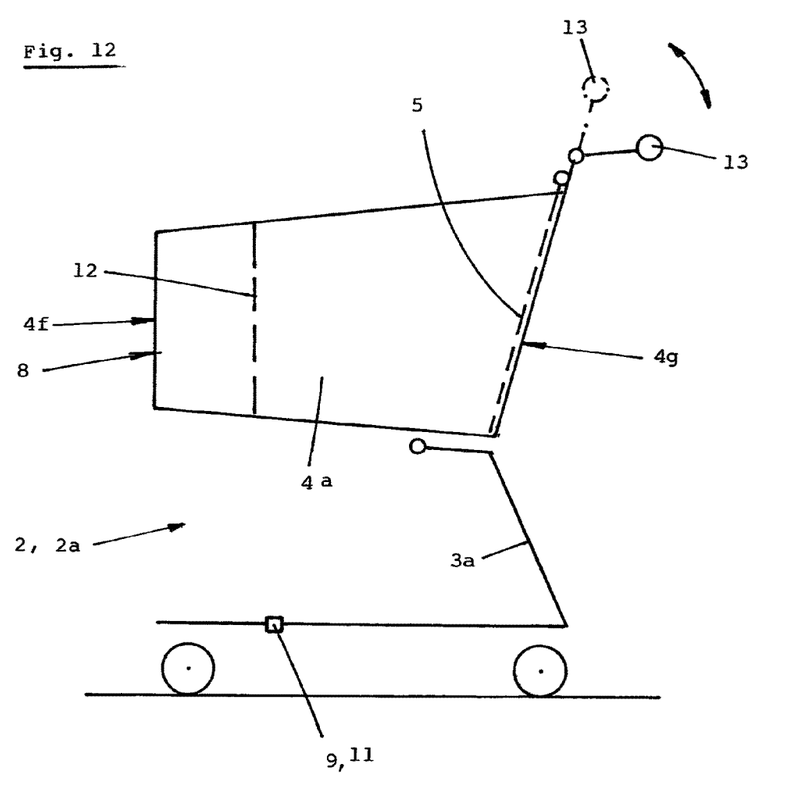
FIG. 12 shows a shopping cart having further possible spacer elements, and FIG. 13 and FIG. 14 in each case show a stack which is formed from chassis and baskets and is intended for transport.

FIG. 12 shows yet further options of how spacer elements 9 can be designed and arranged or can be formed by functional parts which are located on the shopping cart 2 in any case. Thus, for example, after the shopping carts 2 have been transported, a transverse strut 11 which can be used as spacer element 9 and serves, for example, to reinforce the chassis 3 can be retrofitted to the lower chassis frame 3b, against which transverse strut 11 the front side of the chassis 3a of a shopping cart 2a to be pushed in butts, in order then to form the greater stack spacing b. As viewed in the side view of the shopping cart 2a, the spacer element 9 which is formed in this way is located between the front side 4f and the rear side 4g of the basket 4.

The known pivotable rear wall 5 of the basket 4, which rear wall 5 is located on the rear side of the basket 4, can also additionally assume the function of a spacer element 9. In the stack 1a, the rear walls 5 which are pressed upward with the exception of the last shopping cart 2a which was pushed in require a certain amount of clearance, in order to avoid jamming with adjacent rear walls 5. Said clearance ultimately brings about a greater stack spacing b. If a stack 1 of shopping carts 2 is transported without inserted rear walls 5, the individual stack spacings are reduced to the amount a. This results in a stack 1 which is intended for transport with the length A and, after the rear walls 5 have been inserted into the shopping carts 2a, a stack 1a which has the length B and is intended for a collection point 14.

The same situation can also be achieved if, after the stack 1 has been transported, a dividing wall 12 which is provided in the front region of the basket 4 and assumes the function of a spacer element 9 is inserted subsequently into each basket 4 of the shopping carts 2 in such a way that the front side 4f of the basket 4a of a shopping cart 2a to be pushed in butts against the dividing wall 12 and therefore forms a greater stack spacing b. Here too, the spacer element 9 which is formed in this way is located between the front side 4f and the rear side 4g of the basket 4.

The handle 13 of each shopping cart 2a can also serve as spacer element 9, since, after the shopping carts 2 have been transported, the handle 13 can be fastened, for example, to the basket 4 in a latching and stationary manner, in order to produce a greater stack spacing b between each shopping cart 2a and therefore the greater length B of the stack 1a. The handle 13 is located on the rear side 4g of the basket 4 and therefore at the rear of the shopping cart 2, 2a.

Instead of a handle 13 which can be fastened in a stationary manner, a movable handle 13 which assumes the function of a spacer element 9 can likewise be arranged on the rear side 4g of the basket 4 or on the rear side of the chassis 3, which handle 13 can be transferred from a first fixed position with the resulting stack spacings a into a second fixed position with the resulting stack spacings b. If, namely, the handle 13 which extends transversely as is known is mounted such that it can be moved about a horizontal axis, the handle 13 of each shopping cart 2 can be pivoted upward for the purpose of transport, with the result that the stack spacings with the dimension a and the length of the stack 1 with the dimension A are set. If, after transport has taken place, the handles 13 of the shopping carts 2 are pivoted downward into the use position, in which the handles 13 are then subsequently locked in a stationary manner, this results in the greater stack spacings b which are formed between the shopping carts 2a and therefore in the greater overall length B of the stack 1a which is then suitable for being kept available at a collection point 14. With the exception of the movable handle 13, all the solution examples proposed here again use the dimensional relationships which have already been described and result in combination with the unused stack space region 8.

Figure 13:
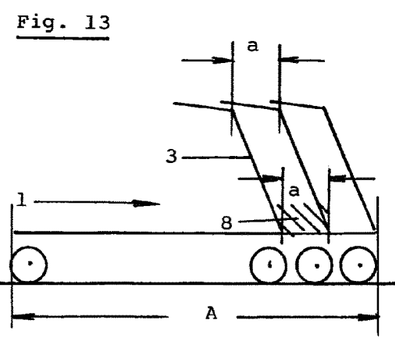
Figure 14:
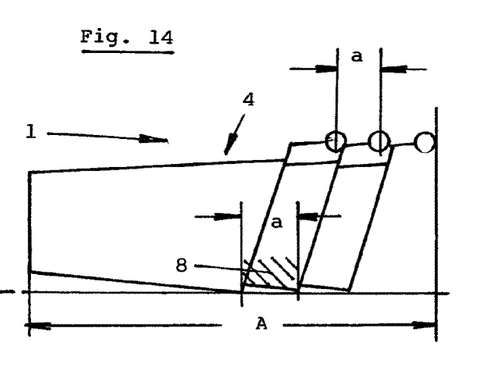

According to FIGS. 13 and 14, the advantage of the invention can also be achieved when the baskets 4 are separated from the chassis 3 for transporting the shopping carts 2. FIG. 12 shows a stack 1 which is formed from identical chassis 3, is intended for transport and has the overall length A. The spacer elements 9 are missing on the chassis 3. The stack spacing between the individual chassis 3 is again the dimension a. If the spacer elements 9 are mounted on the chassis 3 after transport has taken place, the result is the greater stack spacing b.

FIG. 13 shows a stack 1 which is formed only by the baskets 4 and is intended for transport. The stack spacing which is formed in each case between the baskets 4 is labeled with a. It is also possible in this case to change the respective stack spacings with the length a into stack spacings with the length b by subsequent attaching of the spacer elements 9 to the baskets 4. After the shopping carts 2a have been assembled and after the stack 1a which has been produced in the process has been kept available at a collection point 14, the length of said stack 1a is the dimension B. Further identical details, such as also the stack space region 8, can be gathered from the entire description. This also applies to all movable spacer elements 9 which can be attached either to the chassis 3 or to the baskets 4 before they are dispatched.

The specified exemplary embodiments show that, even just on account of the different designs of known shopping carts 2, there are a multiplicity of options to utilize the advantages of the invention with the aid of spacer elements 9. To this extent, all the fastening points 10a which are described can also be used in a manner which is familiar to a person skilled in the art, both by the spacer elements 9 which can be attached subsequently and by the movable spacer elements 9. The expression "spacer element" is also to be understood not only as an "element" per se, but rather quite generally as a device which is intended and suitable for enlarging stack spacings between individual shopping carts 2 from a into b and therefore the length of a stack 1 from A into B, in order to obtain a stack 1a.

The invention claimed is:

1. A stack comprising a number of identical shopping carts pushed one inside the other, which stack are transportable with the aid of transport means and, after having been transported to a collection point which is set up by self-service stores, is kept available for the removal and for the use of the individual shopping carts, the shopping carts which are equipped with a chassis and with a basket which is connected to the chassis being pushed one inside the other with their chassis and with their baskets both during transport and at the collection point, in such a way that a stack spacing is formed between each shopping cart, wherein
   either spacer elements are attached to the shopping carts of the stack which is intended subsequently for the collection point, in that a stack spacing b is formed in each case by the spacer elements between the shopping carts, in that the stack spacing b is greater than the stack spacing a which is formed between the shopping carts of the stack which is intended for transport, and in that the length B of the stack which is provided for the collection point is greater than the length A of the stack which is intended for transport,
   or in that movably arranged spacer elements are attached to the shopping carts, in that the spacer elements are transferable from a first position into a second position in which they are in a use position, in that a stack spacing a is formed between each shopping cart in the first position and a stack spacing b is formed between each shopping cart in the second position, in that the stack spacing b is greater than the stack spacing a, in that the length B of the stack having the stack spacings b is greater than the length A of the same stack having the stack spacings a, and in that the stack having the length A is intended for transport and the stack having the length B is intended for being kept available at a collection point,
   wherein the movable spacer elements of the shopping carts of the stack which is intended for transport are arranged on the shopping carts in such a way that, or assume a position such that, the spacer elements of each shopping cart either assume their use position automatically or are manually transferable into their use position, in which the spacer elements remain, after said shopping cart has been removed from the stack.

2. A stack comprising a number of identical chassis pushed one inside the other or a number of identical baskets fitted one inside the other, it being possible for both stacks to be transported with the aid of transport means and, after having been transported, to be joined together to form utilizable shopping carts, with the result that the stack which is produced as a result and is formed from identical shopping carts are kept available for the removal and for the use of the shopping carts at a collection point which is set up by self-service stores, wherein spacer elements are attached to the chassis and/or or to the baskets of the shopping carts of the stack which is intended for the collection point, in that a stack spacing b is formed in each case by the spacer elements between the chassis or between the baskets, which stack spacing b is greater than the stack spacing a which is formed between the chassis or the baskets which are intended for transport, and in that the length B of the stack comprising the assembled shopping carts and having the stack spacings b is greater than the length A of the stack which is formed from the same number of chassis or baskets and has the stack spacings a.

3. The stack as claimed in claim 1, wherein at least one spacer element is provided on each shopping cart, and in that the at least one spacer element is arranged either on the basket or on the chassis or on supporting devices which connect the basket to the chassis.

4. The stack as claimed in claim 1, wherein the at least one spacer element is arranged in front of or behind the stack space region which results when two shopping carts which are intended for transport are pushed one inside the other.

5. The stack as claimed in claim 1, wherein, as viewed in a side view of the shopping carts, each spacer element is arranged in a region between the front side and the rear side of the respective basket.

6. The stack as claimed in claim 3, wherein the spacer element or elements is or are arranged on a transverse connection which connects the longitudinal sides of each chassis, or transverse connection sections, or on the underside of the basket floor or on the side walls of the basket or on the lower rear edge of each basket.

7. The stack as claimed in claim 1, wherein, when the shopping carts are pushed one inside the other, the at least one spacer element of a shopping cart to be pushed in butts either against the chassis or against the rear lower edge of the basket or against the rear boundary of the side walls of the basket of a shopping cart located in front of it, or in that, during the same operation, the chassis or the transverse connection of the transverse connection sections or a shopping cart to be pushed in comes or come into contact with the at least one spacer element of a shopping cart located in front of it, which spacer element projects beyond the lower edge of the basket in a rearward or downward manner.

8. The stack as claimed in claim 1, wherein, in the stacked state of the shopping carts which are provided in a stack intended for transport, the at least one movable spacer element of the shopping carts is accommodated in each case in a space which is situated between the basket floor of a shopping cart and the basket floor of the shopping cart located in each case in front of it.

9. The stack as claimed in claim 7, wherein the movable spacer elements of the shopping carts which are located in the stack are locked releasably in their non-use position or remain automatically in their non-use position on account of the position of their centroid.

10. The stack as claimed in claim 1, wherein the at least one spacer holder is additionally supported on at least one supporting part when a stack spacing b is formed in each case between the shopping carts.

11. The stack as claimed in claim 1, wherein the basket of each shopping cart is additionally supported on the chassis with the aid of the at least one spacer element.

12. The stack as claimed in claim 1, wherein the spacer elements of the shopping carts are formed either
    by a transverse strut which is insertable into the lower chassis frame,
    or by a rear wall which is insertable into the basket,
    or by a dividing wall which is insertable into the front region of the basket,
    or by a handle which is able to be placed onto the basket or onto the chassis in a latching manner,
    or by a handle which is transferable from a first position to a second position.

13. The stack as claimed in claim 2, wherein at least one spacer element is provided on each shopping cart, and in that the at least one spacer element is arranged either on the basket or on the chassis or on supporting devices which connect the basket to the chassis.

14. The stack as claimed in claim 2, wherein, as viewed in a side view of the shopping carts, each spacer element is arranged in a region between the front side and the rear side of the respective basket.

15. The stack as claimed in claim 8, wherein the movable spacer elements of the shopping carts of the stack which is intended for transport are arranged on the shopping carts in such a way that, or assume a position such that, the spacer elements of each shopping cart assume their use position automatically after said shopping cart has been removed from the stack.

16. A stack comprising a number of identical chassis pushed one inside the other and a number of identical baskets fitted one inside the other, it being possible for both stacks to be transported with the aid of transport means and, after having been transported, to be joined together to form utilizable shopping carts, with the result that the stack which is produced as a result and is formed from identical shopping carts are kept available for the removal and for the use of the shopping carts at a collection point which is set up by self-service stores, wherein spacer elements are attached to the chassis or to the baskets of the shopping carts of the stack which is intended for the collection point, in that a stack spacing b is formed in each case by the spacer elements between the chassis and between the baskets, which stack spacing b is greater than the stack spacing a which is formed between the chassis and the baskets which are intended for transport, and in that the length B of the stack comprising the assembled shopping carts and having the stack spacings b is greater than the length A of the stack which is formed from the same number of chassis and baskets and has the stack spacings a.

17. The stack as claimed in claim 16, wherein at least one spacer element is provided on each shopping cart, and in that the at least one spacer element is arranged either on the basket or on the chassis or on supporting devices which connect the basket to the chassis.

18. The stack as claimed in claim 16, wherein, as viewed in a side view of the shopping carts, each spacer element is arranged in a region between the front side and the rear side of the respective basket.

* * * * *